(12) United States Patent  (10) Patent No.: US 8,850,190 B2
Li et al.  (45) Date of Patent: Sep. 30, 2014

(54) SECRET COMMUNICATION METHOD AND SYSTEM BETWEEN NEIGHBORING USER TERMINALS, TERMINAL, SWITCHING EQUIPMENT

(75) Inventors: Qin Li, Shaanxi (CN); Jun Cao, Shaanxi (CN); Manxia Tie, Shaanxi (CN); Zhenhai Huang, Shaanxi (CN); Zhiqiang Du, Shaanxi (CN)

(73) Assignee: China IWNCOMM Co., Ltd., Shaanxi (CN)

( * ) Notice: Subject to any disclaimer, the term of this patent is extended or adjusted under 35 U.S.C. 154(b) by 0 days.

(21) Appl. No.: 13/814,899

(22) PCT Filed: Apr. 27, 2011

(86) PCT No.: PCT/CN2011/073367
§ 371 (c)(1),
(2), (4) Date: Feb. 26, 2013

(87) PCT Pub. No.: WO2012/019466
PCT Pub. Date: Feb. 16, 2012

(65) Prior Publication Data
US 2013/0159706 A1  Jun. 20, 2013

(30) Foreign Application Priority Data
Aug. 12, 2010 (CN) .......................... 2010 1 0251996

(51) Int. Cl.
*H04L 29/06* (2006.01)
*H04L 9/32* (2006.01)
*H04L 9/08* (2006.01)

(52) U.S. Cl.
CPC .............. *H04L 9/0816* (2013.01); *H04L 9/321* (2013.01); *H04L 9/083* (2013.01)
USPC ................................................ 713/156; 726/3

(58) Field of Classification Search
USPC ......................................................... 713/156
See application file for complete search history.

(56) References Cited

U.S. PATENT DOCUMENTS

2006/0133613 A1* 6/2006 Ando et al. .................... 380/270
2012/0254617 A1 10/2012 Li et al.
(Continued)

FOREIGN PATENT DOCUMENTS

CN  101005359  7/2007
CN  101247642 A  8/2008
(Continued)

OTHER PUBLICATIONS

P. Nicopolitidis; Distributed protocols for ad hoc wireless LANs:a learning-automata-based approach; Sep. 2003; Science Direct; p. 1-13.*
(Continued)

*Primary Examiner* — Mohammad W Reza
*Assistant Examiner* — Monjour Rahim
(74) *Attorney, Agent, or Firm* — Hanley, Flight & Zimmerman, LLC

(57) ABSTRACT

The present invention provides a secret communication method, apparatus and system. The method comprises: 1) determining a neighboring encryption switching equipment shared by a first user terminal and a second user terminal, wherein the first user terminal and the second user terminal are neighboring user terminals (1); 2) establishing, by the neighboring encryption switching equipment, an inter-station key for communication between the first user terminal and the second terminal (2); 3) performing data secret communication between the first user terminal and the second terminal by using the inter-station key (3). With the present invention, the neighboring user terminals needing to perform the secret communication can establish the inter-station key without performing identity authentication with each other, and can perform the secret communication with the inter-station key, and thereby the network load is reduced.

15 Claims, 2 Drawing Sheets

(56) References Cited

U.S. PATENT DOCUMENTS

| | | |
|---|---|---|
| 2012/0257755 A1 | 10/2012 | Ge et al. |
| 2012/0278623 A1 | 11/2012 | Tie et al. |
| 2013/0159706 A1 | 6/2013 | Li et al. |

FOREIGN PATENT DOCUMENTS

| | | |
|---|---|---|
| CN | 101729249 A | 6/2010 |
| CN | 101741547 A | 6/2010 |
| CN | 101741548 A | 6/2010 |
| CN | 101800943 | 8/2010 |
| CN | 101808286 | 8/2010 |
| CN | 101917272 | 7/2012 |
| WO | 2006/108907 | 10/2006 |
| WO | 2012019466 | 2/2012 |

OTHER PUBLICATIONS

International Searching Authority, "English Translation of International Preliminary Report on Patentability", issued in connection with corresponding PCT Application No. PCT/CN2011/073367, issued on Feb. 12, 2013 (7 pages).

International Searching Authority, "English Translation of Written Opinion of the International Searching Authority", issued in connection with corresponding PCT Application No. PCT/CN2011/073367, issued on Jul. 19, 2011 (6 pages).

SIPO, "First Office Action", issued in connection with Chinese patent application No. 201010251996.5, dated Oct. 14, 2011, (4 pages).

SIPO, Second Office Action, issued in connection with Chinese patent application No. 201010251996.5, dated Feb. 16, 2012, (4 pages).

International Searching Authoity, "Search Report", issued in connection with PCT patent application No. PCT/CN2011/073367, mailed Jul. 28, 2011 (12 pages).

IEEE, "IEEE Standard for Local and metropolitan area networks; Media Access Control (MAC) Security", IEEE Computer Society, IEEE Std 802.1AE, Sponsored by the LAN/MAN Standards Committee, Aug. 18, 2006 (154 pages).

IEEE, "IEEE Standard for Information technology; Telecommunications and information; Local and metropolitan area networks; Specific requirements; Part 3: Carrier sense multiple access with Collision Detection (CSMA/CD) Access Method and Physical Layer Specifications: Section One", IEEE Computer Society, IEEE Std 802.3AE, Sponsored by the LAN/MAN Standards Committee, Dec. 26, 2008 (671 pages).

IEEE, "IEEE Standard for Information technology; Telecommunications and information; Local and metropolitan area networks; Specific requirements; Part 3: Carrier sense multiple access with Collision Detection (CSMA/CD) Access Method and Physical Layer Specifications: Section Two", IEEE Computer Society, IEEE Std 802.3AE, Sponsored by the LAN/MAN Standards Committee, Dec. 26, 2008 (790 pages).

IEEE, "IEEE Standard for Information technology; Telecommunications and information; Local and metropolitan area networks; Specific requirements; Part 3: Carrier sense multiple access with Collision Detection (CSMA/CD) Access Method and Physical Layer Specifications: Section Three", IEEE Computer Society, IEEE Std 802.3AE, Sponsored by the LAN/MAN Standards Committee, Dec. 26, 2008 (315 pages).

IEEE, "IEEE Standard for Information technology; Telecommunications and information; Local and metropolitan area networks; Specific requirements; Part 3: Carrier sense multiple access with Collision Detection (CSMA/CD) Access Method and Physical Layer Specifications: Section Four", IEEE Computer Society, IEEE Std 802.3AE, Sponsored by the LAN/MAN Standards Committee, Dec. 26, 2008 (586 pages).

IEEE, "IEEE Standard for Information technology; Telecommunications and information; Local and metropolitan area networks; Specific requirements; Part 3: Carrier sense multiple access with Collision Detection (CSMA/CD) Access Method and Physical Layer Specifications: Section Five", IEEE Computer Society, IEEE Std 802.3AE, Sponsored by the LAN/MAN Standards Committee, Dec. 26, 2008 (615 pages).

* cited by examiner

SECRET COMMUNICATION METHOD AND SYSTEM BETWEEN NEIGHBORING USER TERMINALS, TERMINAL, SWITCHING EQUIPMENT

CROSS-REFERENCE TO RELATED APPLICATION

This application claims priority to Chinese Patent Application No. 201010251996.5 filed on Aug. 12, 2010 before the State Intellectual Property Office of China and entitled "Secret Communication Method and System between Neighboring User Terminals", which is hereby incorporated by reference in its entirety.

FIELD OF THE INVENTION

The present invention relates to the field of communication network safety application, and more particularly to a secret communication method and system between neighboring user terminals, user terminal, encryption switching equipment.

BACKGROUND OF THE INVENTION

A wired local area network is usually a broadcast type network where data transmitted from a node can be received by all the other nodes. Various nodes over the network share a channel, and this brings about great hidden risks of safety to the network. Once an attacker accesses and listens to a network, he can capture all the packets on the network and hence steal essential information.

Local area network (LAN) defined by the current [Chinese] National Standard GB/T 15629.3 (which corresponds to IEEE 802.3 or ISO/IEC 8802-3) does not provide any data secrecy method. In researches carried out in foreign countries, IEEE 802.1AE standard released by IEEE provides data encryption protocol to protect the Ethernet and makes use of hop-by-hop encryption safety measure to realize safe transmission of data between network nodes. However, such hop-by-hop encryption safety measure is only directed to the circumstance in which there is and only an encryption switching equipment between terminal user A and terminal user B, and cannot be applied in the scenario in which packets between terminal user A and terminal user B do not go through any encryption switching equipment, namely secret communication between neighboring user terminals. The protocol itself does not provide any secret communication mechanism between the neighboring user terminals.

As proposed by scholars versed in the art, a shared key could be established between neighboring user terminals via an authentication mechanism. Although such a method makes it possible to realize secret communication between neighboring user terminals without any encryption switching equipment, any two user terminals neighboring to each other establish a shared key by way of authentication in a local area network application, and this undoubtedly increases the network load.

SUMMARY OF THE INVENTION

In order to solve the aforementioned technical problem existent in the art, the present invention provides a secret communication method and system between neighboring user terminals, user terminal, encryption switching equipment to solve the technical problem needing to be solved in the prior art in which it is necessary, while a shared key is established, to perform identity authentication between every two neighboring user terminals carrying out secret communication therebetween, thereby aggravating the computational load of the network.

One aspect of the present invention is a secret communication method between neighboring user terminals, comprising: 1) determining a neighboring encryption switching equipment shared by a first user terminal and a second user terminal, wherein the first user terminal and the second user terminal are neighboring user terminals; 2) establishing an inter-station key for communication between the first user terminal and the second user terminal by the neighboring encryption switching equipment; and 3) performing data secret communication between the first user terminal and the second user terminal by using the inter-station key.

Correspondingly, the present invention further provides a secret communication system between neighboring user terminals, which system comprises a first user terminal STA1 and a second user terminal STA2 neighboring to each other, a neighboring encryption switching equipment ESW-B shared by the first user terminal STA1 and the second user terminal STA2, and an intermediate equipment capable of receiving packets between the first user terminal STA1 and the second user terminal STA2; wherein the first user terminal STA1 transmits a neighboring encryption switching equipment selection requesting packet M1 to the second user terminal STA2; after receiving the neighboring encryption switching equipment selection requesting packet M1 transmitted by the first user terminal STA1, the second user terminal STA2 constructs a neighboring encryption switching equipment selection responding packet M2, and transmits the neighboring encryption switching equipment selection responding packet M2 to the first user terminal STA1; the first user terminal STA1 transmits an inter-station key requesting packet M3 to the neighboring encryption switching equipment ESW-B; after receiving the inter-station key requesting packet M3 transmitted from the first user terminal STA1, the neighboring encryption switching equipment ESW-B generates a random number, takes the random number as an inter-station key $STAKey_{1-2}$ between the first user terminal STA1 and the second user terminal STA2, constructs an inter-station key notifying packet M4, and transmits the inter-station key notifying packet M4 to the second user terminal STA2; after receiving the inter-station key notifying packet M4 transmitted from the neighboring encryption switching equipment ESW-B, the second user terminal STA2 decrypts the inter-station key notifying packet M4, obtains the inter-station key $STAKey_{1-2}$ between the first user terminal STA1 and the second user terminal STA2, constructs an inter-station key notification responding packet M5, and transmits the inter-station key notification responding packet M5 to the neighboring encryption switching equipment ESW-B; after receiving the inter-station key notification responding packet M5 transmitted from the second user terminal STA2, the neighboring encryption switching equipment ESW-B constructs an inter-station key responding packet M6, and transmits the inter-station key responding packet M6 to the first user terminal STA1; after receiving the inter-station key responding packet M6 transmitted from the neighboring encryption switching equipment ESW-B, the first user terminal STA1 decrypts the inter-station key responding packet M6, and obtains the inter-station key $STAKey_{1-2}$ between the first user terminal STA1 and the second user terminal STA2; the first user terminal and the second user terminal perform data secret communication by using the inter-station key $STAKey_{1-2}$.

Correspondingly, the present invention further provides a user terminal neighboring to a second user terminal, comprising: a determining module configured to determine a neighboring encryption switching equipment between the user terminal and the second user terminal; an obtaining module configured to obtain from the neighboring encryption switching equipment an inter-station key for communication with the second user terminal; and a communicating unit configured to communicate with the second user terminal by using the inter-station key.

Correspondingly, the present invention further provides an encryption switching equipment neighboring to a first user terminal and a second user terminal, respectively, comprising: a first receiving module configured to receive an inter-station key requesting packet (M3) transmitted from the first user terminal (STA1) for helping to establish an inter-station key between the first user terminal (STA1) and the second user terminal (STA2); a first generating module configured to generate a random number according to the inter-station key requesting packet (M3), take the random number as an inter-station key $STAKey_{1-2}$ between the first user terminal (STA1) and the second user terminal (STA2), and construct an inter-station key notifying packet (M4), wherein the inter-station key notifying packet (M4) includes identity information of the first user terminal (STA1) and a field of encrypted information of $STAKey_{1-2}$ protected by a shared key $KEY_{B-2}$ between the neighboring encryption switching equipment (ESW-B) and the second user terminal (STA2); a first transmitting module configured to transmit the inter-station key notifying packet (M4) to the second user terminal (STA2); a second receiving module configured to receive an inter-station key notification responding packet (M5) transmitted from the second user terminal (STA2), wherein the inter-station key notification responding packet (M5) includes identity information of the first user terminal (STA1); a second generating module configured to construct an inter-station key responding packet (M6), wherein the inter-station key responding packet (M6) includes identity information of the second user terminal (STA2) and a field of encrypted information of $STAKey_{1-2}$ protected by a shared key $KEY_{B-1}$ between the neighboring encryption switching equipment (ESW-B) and the first user terminal (STA1); and a second transmitting module configured to transmit the inter-station key responding packet (M6) to the first user terminal (STA1).

Advantages of the present invention rest as follows. The present invention provides a secret communication method and system between neighboring user terminals, user terminals and encryption switching equipment. Under a safe network framework, when secret communication is performed between neighboring user terminals, a neighboring switching equipment shared by the neighboring user terminals is used to establish an inter-station key between the neighboring user terminals, whereby it is possible for the neighboring user terminals to directly use this inter-station key to realize secret transmission of data, thereby providing a feasible mechanism for secret communication between the neighboring user terminals. Moreover, secret transmission of data is realized in the method without identity authentication between every two neighboring user terminals needing to perform secret communication, and this reduces network load.

DETAILED DESCRIPTION OF THE PREFERRED EMBODIMENTS

It is defined in the secret communication method, device and system provided by the present invention that any two user terminals be neighboring user terminals to each other when packets between the two user terminals do not go through any encryption switching equipment. Packets between neighboring user terminals will go through one or more hubs or non-encryption switching equipments, and such hubs or non-encryption switching equipments are herein referred to as general intermediate equipments between the neighboring user terminals.

Figure 1:
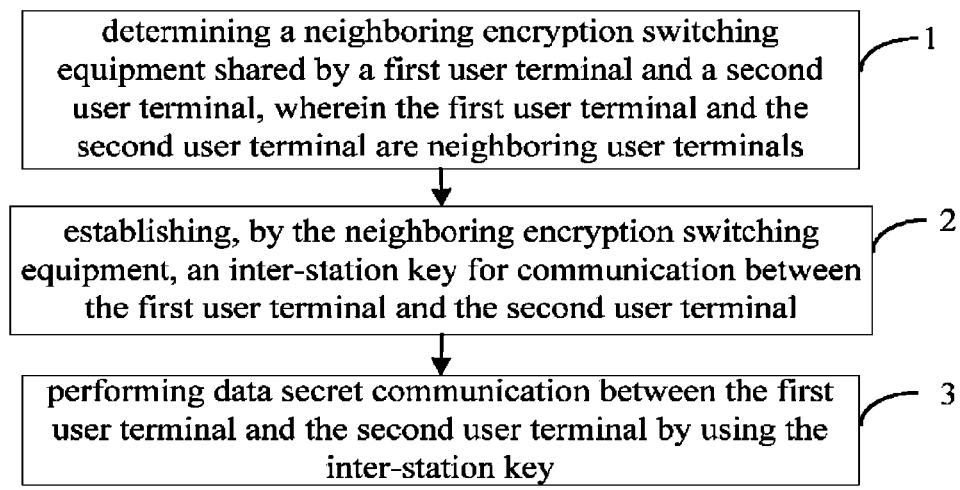
FIG. 1 is a flowchart illustrating a secret communication method between neighboring user terminals provided by the present invention.
Figure 2:
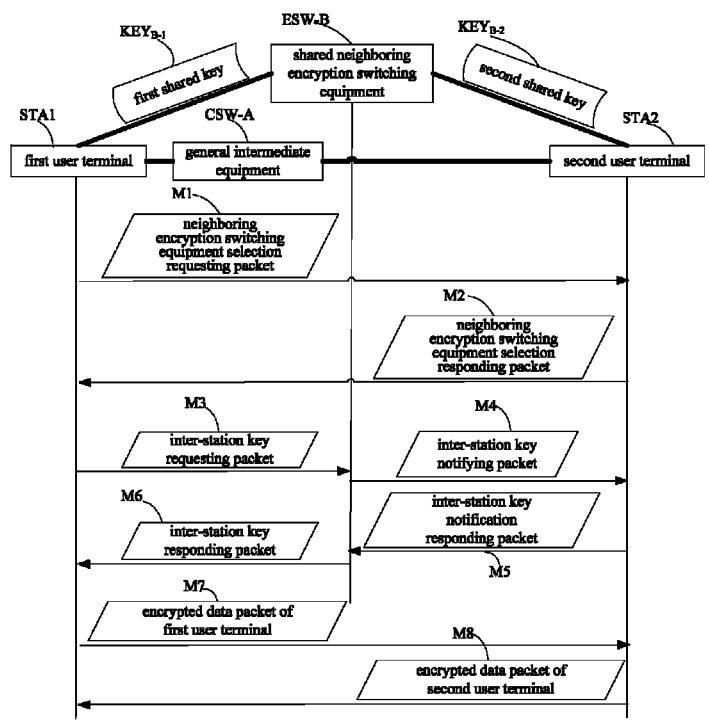
FIG. 2 is a schematic diagram illustrating the structure of a secret communication system between neighboring user terminals provided by the present invention.

Refer to FIGS. 1 and 2, STA1 indicates a first user terminal, STA2 indicates a second user terminal, ESW-B indicates a neighboring encryption switching equipment shared by the first user terminal STA1 and the second user terminal STA2, and CSW-A indicates a general intermediate equipment between the first user terminal STA1 and the second user terminal STA2. The first user terminal STA1 and the ESW-B are neighbors, and a shared key $KEY_{B-1}$ has already been established therebetween. The second user terminal STA2 and the ESW-B are neighbors, and a shared key $KEY_{B-2}$ has already been established therebetween. According to the definition of the present invention, the first user terminal STA1 and the second user terminal STA2 are neighboring user terminals.

Refer to FIG. 1 which is a flowchart illustrating a secret communication method between neighboring user terminals provided by the present invention, explanation is made in this embodiment with a process in which the first user terminal STA1 initiates data secret communication with the second user terminal STA2 as an example, the method comprises:

1) Determining a neighboring encryption switching equipment shared by a first user terminal and a second user terminal, wherein the first user terminal and the second user terminal are neighboring user terminals. Determination of the neighboring encryption switching equipment can be realized by the following steps:

1.1) The first user terminal STA1 transmits a neighboring encryption switching equipment selection requesting packet M1 to the second user terminal STA2; the packet M1 includes a list of information of neighboring encryption switching equipments of the first user terminal STA1;

1.2) After receiving the neighboring encryption switching equipment selection requesting packet M1, the second user terminal STA2 looks up a list of neighboring encryption switching equipments of the second user terminal STA2, selects a neighboring encryption switching equipment shared with the first user terminal STA1, constructs a neighboring encryption switching equipment selection responding packet M2, and transmits it to the first user terminal STA1; the packet M2 includes information of the neighboring encryption switching equipment selected by the second user terminal STA2 and shared with the first user terminal STA1;

1.3) After receiving the neighboring encryption switching equipment selection responding packet M2, the first user terminal STA1 extracts the information of the neighboring encryption switching equipment selected by the second user terminal STA2 and shared with the first user terminal STA1;

During a specific implementation, it is also possible in the aforementioned process 1) for selecting the neighboring encryption switching equipment to realize negotiation of such safety parameter suite as an encryption algorithm used in the secret communication between the first user terminal STA1 and the second user terminal STA2, the specific method is as follows: the neighboring encryption switching equipment selection requesting packet M1 constructed by the first user terminal STA1 further includes a field of list of safety parameter suites such as encryption algorithms supported by the first user terminal STA1; correspondingly, the neighboring encryption switching equipment selection responding packet M2 constructed by the second user terminal STA2 further includes a field of safety parameter suite such as an encryption algorithm also supported by the second user terminal STA2 as selected by the second user terminal STA2 from the list of safety parameter suites such as encryption algorithms supported by the first user terminal STA1. In other words, the first user terminal STA1 transmits the neighboring encryption switching equipment selection requesting packet M1 to the second user terminal M2; the neighboring encryption switching equipment selection requesting packet M1 includes a field of list of information of neighboring encryption switching equipments of the first user terminal STA1 and a field of list of encryption algorithm safety parameter suites supported by the first user terminal STA1; after receiving the neighboring encryption switching equipment selection requesting packet M1 transmitted from the first user terminal STA1, the second user terminal STA2 selects a neighboring encryption switching equipment shared with the first user terminal STA1 and an encryption algorithm safety parameter suite supported by both the first and second user terminals according to the field of list of information of neighboring encryption switching equipments of the first user terminal STA1 and the field of list of encryption algorithm safety parameter suites supported by the first user terminal STA1 in the packet, constructs the neighboring encryption switching equipment selection responding packet M2, and transmits the neighboring encryption switching equipment selection responding packet M2 to the first user terminal STA1; the neighboring encryption switching equipment selection responding packet M2 includes information of the neighboring encryption switching equipment selected by the second user terminal STA2 and shared with the first user terminal STA1, and a field of safety parameter suite such as an encryption algorithm also supported by the second user terminal STA2 as selected by the second user terminal STA2 from the list of encryption algorithm safety parameter suites supported by the first user terminal STA1; after receiving the neighboring encryption switching equipment selection responding packet M2 transmitted from the second user terminal STA2, the first user terminal STA1 extracts the information of the neighboring encryption switching equipment selected by the second user terminal STA2 and shared with the first user terminal STA1 and the encryption algorithm safety parameter suite supported by both and selected by the second user terminal STA2.

By virtue of the aforementioned method, it is possible to realize negotiation of such safety parameter suite as the encryption algorithm used in the secret communication between the first user terminal STA1 and the second user terminal STA2, and thereafter a safety parameter suite such as the encryption algorithm determined by the negotiation can be used during the data secret communication stage after an inter-station key has been established between the first user terminal STA1 and the second user terminal STA2.

2) Establishing, by the neighboring encryption switching equipment, an inter-station key used for performing communication between the first user terminal and the second user terminal, i.e. a process for establishing an inter-station key.

This step is explained with an example in which the first user terminal STA1 and the second user terminal STA2 select the neighboring encryption switching equipment ESW-B through the 1) process for selecting a neighboring encryption switching equipment. The process for establishing an inter-station key can be realized by the following steps:

2.1) The first user terminal STA1 transmits an inter-station key requesting packet M3 to a neighboring encryption switching equipment ESW-B for requesting to help to establish an inter-station key between first user terminal STA1 and the second user terminal STA2; the packet M3 includes identity information of the second user terminal STA2.

2.2) After receiving the inter-station key requesting packet M3, the neighboring encryption switching equipment ESW-B generates a random number as an inter-station key $STAKey_{1-2}$ between the first user terminal STA1 and the second user terminal STA2, constructs an inter-station key notifying packet M4 and transmits it to the second user terminal STA2; the packet M4 includes identity information of the first user terminal STA1 and a field of encrypted information of $STAKey_{1-2}$ protected by a shared key $KEY_{B-2}$ between the neighboring encryption switching equipment ESW-B and the second user terminal STA2.

2.3) After receiving the inter-station key notifying packet M4, the second user terminal STA2 decrypts the field of encrypted information of $STAKey_{1-2}$ by using the key $KEY_{B-2}$ between the second user terminal STA2 and the neighboring encryption switching equipment ESW-B to obtain $STAKey_{1-2}$ information, namely to obtain the inter-station key between the first user terminal STA1 and the second user terminal STA2, and thereafter constructs an inter-station key notification responding packet M5 and transmits it to the neighboring encryption switching equipment ESW-B.

2.4) After receiving the inter-station key notification responding packet M5, the neighboring encryption switching equipment ESW-B learns that the second user terminal STA2 has received inter-station key information between the first user terminal STA1 and the second user terminal STA2, constructs an inter-station key responding packet M6 and transmits it to the first user terminal STA1; the packet M6 includes identity information of the second user terminal STA2 and a field of encrypted information of $STAKey_{1-2}$ protected by a shared key $KEY_{B-1}$ between the neighboring encryption switching equipment ESW-B and the first user terminal STA1.

2.5) After receiving the inter-station key responding packet M6, the first user terminal STA1 decrypts the field of encrypted information of $STAKey_{1-2}$ by using the key $KEY_{B-1}$ between the first user terminal STA1 and the neighboring encryption switching equipment ESW-B to obtain $STAKey_{1-2}$ information, namely to obtain the inter-station key between the first user terminal STA1 and the second user terminal STA2.

In a specific implementation, in order for each packet to guarantee the integrity of packet message during the aforementioned process 2) for establishing an inter-station key, it is possible to carry in the packet a field of message integrity verification code MIC, which may be a hash value obtained by hash function calculation of other fields than the field of MIC in the packet using a key shared between the constructing party of the packet and the receiving party of the packet. Correspondingly, after receiving the packet, the receiving party firstly verifies whether the MIC is correct, performs the aforementioned message processing process if it is correct, and otherwise discards the packet, the process specifically comprises:

The first user terminal STA1 transmits the inter-station key requesting packet M3 to the neighboring encryption switching equipment ESW-B for requesting to help to establish an inter-station key between the first user terminal STA1 and the second user terminal STA2; the inter-station key requesting packet M3 includes identity information of the second user terminal STA2 and a field of message integrity verification code MIC1, which is a hash value obtained by hash function calculation of other fields than the field of MIC1 in the packet using the shared key $KEY_{B-1}$ between the first user terminal STA1 and the neighboring encryption switching equipment ESW-B by the first user terminal STA1.

After receiving the inter-station key requesting packet M3 transmitted from the first user terminal STA1, the neighboring encryption switching equipment ESW-B verifies whether the field of message integrity verification code MIC1 is correct, discards the packet if it is not correct, generates a random number if it is correct, takes the random number as an inter-station key $STAKey_{1-2}$ between the first user terminal STA1 and the second user terminal STA2, constructs an inter-station key notifying packet M4, and transmits the inter-station key notifying packet M4 to the second user terminal STA2; the inter-station key notifying packet M4 includes identity information of the first user terminal STA1, a field of encrypted information of $STAKey_{1-2}$ protected by a shared key $KEY_{B-2}$ between the neighboring encryption switching equipment ESW-B and the second user terminal STA2, and a field of message integrity verification code MIC2; the field of message integrity verification code MIC2 is a hash value obtained by hash function calculation of other fields than the field of MIC2 in the packet using the shared key $KEY_{B-2}$ between the neighboring encryption switching equipment ESW-B and the second user terminal STA2 by the neighboring encryption switching equipment ESW-B.

After receiving the inter-station key notifying packet M4 transmitted from the neighboring encryption switching equipment ESW-B, the second user terminal STA2 verifies whether the field of message integrity verification code MIC2 is correct, and discards the packet if it is not correct; if it is correct, the second user terminal STA2 decrypts the field of encrypted information of $STAKey_{1-2}$ by using the key $KEY_{B-2}$ between the second user terminal STA2 and the neighboring encryption switching equipment ESW-B to obtain $STAKey_{1-2}$ information, obtains the inter-station key between the first user terminal STA1 and the second user terminal STA2, then constructs an inter-station key notification responding packet M5, and transmits the inter-station key notification responding packet M5 to the neighboring encryption switching equipment ESW-B; the inter-station key notification responding packet M5 includes identity information of the first user terminal STA1 and a field of message integrity verification code MIC3; the field of message integrity verification code MIC3 is a hash value obtained by hash function calculation of other fields than the field of MIC3 in the packet using the shared key $KEY_{B-2}$ between the second user terminal STA2 and the neighboring encryption switching equipment ESW-B by the second user terminal STA2.

After receiving the inter-station key notification responding packet M5 transmitted from the second user terminal STA2, the neighboring encryption switching equipment ESW-B verifies whether the field of message integrity verification code MIC3 is correct, and discards the packet if it is not correct; if it is correct, the neighboring encryption switching equipment ESW-B learns that the second user terminal STA2 has received inter-station key information between the first user terminal STA1 and the second user terminal STA2, constructs an inter-station key responding packet M6, and transmits the inter-station key responding packet M6 to the first user terminal STA1; the inter-station key responding packet M6 includes identity information of the second user terminal STA2, a field of encrypted information of $STAKey_{1-2}$ protected by a shared key $KEY_{B-1}$ between the neighboring encryption switching equipment ESW-B and the first user terminal STA1, and a field of message integrity verification code MIC4; the field of message integrity verification code MIC4 is a hash value obtained by hash function calculation of other fields than the field of MIC4 in the packet using the shared key $KEY_{B-1}$ between the neighboring encryption switching equipment ESW-B and the first user terminal STA1 by the neighboring encryption switching equipment ESW-B.

After receiving the inter-station key responding packet M6 transmitted from the neighboring encryption switching equipment ESW-B, the first user terminal STA1 verifies whether the field of message integrity verification code MIC4 is correct, and discards the packet if it is not correct; if it is correct, the first user terminal STA1 decrypts the field of encrypted information of $STAKey_{1-2}$ by using the key $KEY_{B-1}$ between the first user terminal STA1 and the neighboring encryption switching equipment ESW-B to obtain $STAKey_{1-2}$ information, and obtains the inter-station key between the first user terminal STA1 and the second user terminal STA2.

In a specific implementation, it is also possible in the aforementioned process 2) for establishing an inter-station key to realize negotiation of such safety parameter suite as an encryption algorithm used in the secret communication between the first user terminal STA1 and the second user terminal STA2, the specific method is as follows: the inter-station key requesting packet M3 constructed by the first user terminal STA1 further includes a field of list of safety parameter suites such as encryption algorithms supported by the first user terminal STA1; correspondingly, the inter-station key notifying packet M4 constructed by the neighboring encryption switching equipment ESW-B further includes a field of list of safety parameter suites such as encryption algorithms supported by the first user terminal STA1; the inter-station key notification responding packet M5 constructed by the second user terminal STA2 further includes a field of safety parameter suite such as an encryption algorithm also supported by the second user terminal STA2 as selected by the second user terminal STA2 from the list of safety parameter suites such as encryption algorithms supported by the first user terminal STA1; the inter-station key notification responding packet M5 constructed by the neighboring encryption switching equipment ESW-B further includes a field of safety parameter suite such as an encryption algorithm selected by the second user terminal STA2. By the aforementioned method, it is possible to realize negotiation of such safety parameter suite as the encryption algorithm used in the secret communication between the first user terminal STA1 and the second user terminal STA2, and thereafter a safety parameter suite such as the encryption algorithm determined by the negotiation can be used during the data secret communication stage after an inter-station key has been established between the first user terminal STA1 and the second user terminal STA2. The process specifically comprises the following steps:

The first user terminal STA1 transmits the inter-station key requesting packet M3 to the neighboring encryption switching equipment ESW-B for requesting to help to establish an inter-station key between the first user terminal STA2 and the second user terminal STA2; the inter-station key requesting packet M3 includes identity information of the second user terminal STA2, the field of message integrity verification code MIC1, and a field of list of encryption algorithm safety parameter suites supported by the first user terminal STA1; the field of message integrity verification code MIC1 is a hash value obtained by hash function calculation of other fields than the field of MIC1 in the packet using the shared key $KEY_{B-1}$ between the first user terminal STA1 and the neighboring encryption switching equipment ESW-B by the first user terminal STA1;

After receiving the inter-station key requesting packet M3 transmitted from the first user terminal STA1, the neighboring encryption switching equipment ESW-B verifies whether the field of message integrity verification code MIC is correct, discards the packet if it is not correct, generates a random number if it is correct, takes the random number as an inter-station key $STAKey_{1-2}$ between the first user terminal STA1 and the second user terminal STA2, constructs an inter-station key notifying packet M4, and transmits the inter-station key notifying packet M4 to the second user terminal STA2; the inter-station key notifying packet M4 includes identity information of the first user terminal STA1, a field of encrypted information of $STAKey_{1-2}$ protected by a shared key $KEY_{B-2}$ between the neighboring encryption switching equipment ESW-B and the second user terminal STA2, a field of message integrity verification code MIC2, and a field of list of encryption algorithm safety parameter suites supported by the first user terminal STA1; the field of message integrity verification code MIC2 is a hash value obtained by hash function calculation of other fields than the field of MIC2 in the packet using the shared key $KEY_{B-2}$ between the neighboring encryption switching equipment ESW-B and the second user terminal STA2 by the neighboring encryption switching equipment ESW-B;

After receiving the inter-station key notifying packet M4 transmitted from the neighboring encryption switching equipment ESW-B, the second user terminal STA2 verifies whether the field of message integrity verification code MIC2 is correct, and discards the packet if it is not correct; if it is correct, the second user terminal STA2 decrypts the field of encrypted information of $STAKey_{1-2}$ by using the key $KEY_{B-2}$ between the second user terminal STA2 and the neighboring encryption switching equipment ESW-B to obtain $STAKey_{1-2}$ information, obtains the inter-station key between the second user terminal STA2 and the first user terminal STA1, constructs an inter-station key notification responding packet M5, and transmits the inter-station key notification responding packet M5 to the neighboring encryption switching equipment ESW-B; the inter-station key notification responding packet M5 includes identity information of the first user terminal STA1, a field of encryption algorithm safety parameter suite also supported by the second user terminal STA2 as selected by the second user terminal STA2 from the list of encryption algorithm safety parameter suites supported by the first user terminal STA1, and a field of message integrity verification code MIC3; the field of message integrity verification code MIC3 is a hash value obtained by hash function calculation of other fields than the field of MIC3 in the packet using the shared key $KEY_{B-2}$ between the second user terminal STA2 and the neighboring encryption switching equipment ESW-B by the second user terminal STA2;

After receiving the inter-station key notification responding packet M5 transmitted from the second user terminal STA2, the neighboring encryption switching equipment ESW-B verifies whether the field of message integrity verification code MIC3 is correct, and discards the packet if it is not correct; if it is correct, the neighboring encryption switching equipment ESW-B learns that the second user terminal STA2 has received inter-station key information between the first user terminal STA1 and the second user terminal STA2, constructs an inter-station key responding packet M6, and transmits the inter-station key responding packet M6 to the first user terminal STA1; the inter-station key responding packet M6 includes identity information of the second user terminal STA2, a field of encrypted information of $STAKey_{1-2}$ protected by a shared key $KEY_{B-1}$ between the neighboring encryption switching equipment ESW-B and the first user terminal STA1, a field of message integrity verification code MIC, a field of encryption algorithm safety parameter suite selected by the second user terminal STA2, and a field of message integrity verification code MIC4; the field of message integrity verification code MIC4 is a hash value obtained by hash function calculation of other fields than the field of MIC4 in the packet using the shared key $KEY_{B-1}$ between the neighboring encryption switching equipment ESW-B and the first user terminal STA1 by the neighboring encryption switching equipment ESW-B;

After receiving the inter-station key responding packet M6 transmitted from the neighboring encryption switching equipment ESW-B, the first user terminal STA1 verifies whether the field of message integrity verification code MIC4 is correct, and discards the packet if it is not correct; if it is correct, the first user terminal STA1 decrypts the field of encrypted information of $STAKey_{1-2}$ to obtain $STAKey_{1-2}$ by using the key $KEY_{B-1}$ between the first user terminal STA1 and the neighboring encryption switching equipment ESW-B information; the $STAKey_{1-2}$ is the inter-station key between the first user terminal STA1 and the second user terminal STA2;

3) Performing data secret communication between the first user terminal and the second user terminal by using the inter-station key, i.e. the first user terminal and the second user terminal use the inter-station key to perform data secret communication;

After the inter-station key $STAKey_{1-2}$ between the first user terminal STA1 and the second user terminal STA2 has been established in the aforementioned process 2) for establishing an inter-station key, it is possible for the first user terminal STA1 and the second user terminal STA2 to perform data secret communication by using this inter-station key. Data transmitted from the first user terminal STA1 to the second user terminal STA2 is transmitted in encryption by the first user terminal STA1 by using the $STAKey_{1-2}$, and after receiving the encrypted data, the second user terminal STA2 decrypts the data by using the $STAKey_{1-2}$; correspondingly, data transmitted from the second user terminal STA2 to the first user terminal STA1 is transmitted in encryption by the second user terminal STA2 by using the $STAKey_{1-2}$, and after receiving the encrypted data, the first user terminal STA1 decrypts the data by using the $STAKey_{1-2}$.

Also referring to FIG. 2, which is a schematic diagram illustrating the structure of a secret communication system between neighboring user terminals provided by the present invention, the system comprises: a first user terminal STA1 and a second user terminal STA2 neighboring to each other, a neighboring encryption switching equipment ESW-B shared by the first user terminal STA1 and the second user terminal STA2, and a general intermediate equipment capable of receiving packets between the first user terminal STA1 and the second user terminal STA2. The first user terminal STA1 transmits a neighboring encryption switching equipment selection requesting packet M1 to the second user terminal STA2, receives a neighboring encryption switching equipment selection responding packet M2 transmitted from the second user terminal STA2, transmits an inter-station key requesting packet M3 to the ESW-B, receives an inter-station key request responding packet M4 transmitted from the ESW-B, encrypts a data packet to be transmitted to the second user terminal STA2 by using an inter-station key $STAKey_{1-2}$ and transmits the encrypted data packet to the second user terminal STA2, and decrypts a data packet received from the second user terminal STA2 by using the $STAKey_{1-2}$; The second user terminal STA2 receives the neighboring encryption switching equipment selection requesting packet M1 transmitted from the first user terminal STA1, transmits the neighboring encryption switching equipment selection responding packet M2 to the first user terminal STA1, receives the inter-station key notifying packet M4 transmitted from the ESW-B, transmits an inter-station key notification responding packet M5 to the ESW-B, encrypts a data packet to be transmitted to the first user terminal STA1 by using the inter-station key $STAKey_{1-2}$ and transmits the encrypted data packet to the first user terminal STA1, and decrypts a data packet received from the first user terminal STA1 by using the $STAKey_{1-2}$; The neighboring encryption switching equipment ESW-B shared by the first user terminal STA1 and the second user terminal STA2 receives the inter-station key requesting packet M3 transmitted from the first user terminal STA1, transmits the inter-station key notifying packet M4 to the second user terminal STA2, receives the inter-station key notification responding packet M5 transmitted from the second user terminal STA2, and transmits an inter-station key responding packet M6 to the first user terminal STA1. The general intermediate equipment is a hub or a switching equipment that does not support any encryption mechanism, and the general intermediate equipment directly performs transparent transmission of protocol data and encrypted data packets between the first user terminal STA1 and the second user terminal STA2.

Preferably, there is one or more general intermediate equipments in a secret communication system between neighboring user terminals.

With respect to process for realizing the various equipments in the system, see for details the foregoing process for realizing the corresponding steps in the aforementioned method, and no repetition will be made in this context.

Figure 3:
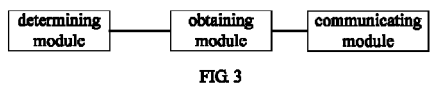
FIG. 3 is a schematic diagram illustrating the structure of a device for secret communication between neighboring user terminals provided by the present invention.

Correspondingly, the present invention further provides a user terminal, see FIG. 3 for the details of structure. The user terminal is neighboring to a second user terminal, and comprises a determining module, an obtaining module and a communicating unit.

The determining module is configured to determine a neighboring encryption switching equipment between the user terminal and the second user terminal. The obtaining module is configured to obtain from the neighboring encryption switching equipment an inter-station key for communication with the second user terminal. The communicating unit is configured to communicate with the second user terminal by using the inter-station key.

Preferably, the obtaining module comprises a transmitting sub-module, a receiving sub-module and a decrypting sub-module, wherein the transmitting sub-module is configured to transmit an inter-station key requesting packet (M3) to the neighboring encryption switching equipment (ESW-B) for requesting to help to establish an inter-station key between the first user terminal (STA1) and the second user terminal (STA2), the inter-station key requesting packet (M3) includes identity information of the second user terminal (STA2); the receiving sub-module is configured to receive an inter-station key responding packet (M6) fed back from the neighboring encryption switching equipment (ESW-B), the inter-station key responding packet (M6) includes identity information of the second user terminal (STA2) and a field of encrypted information of $STAKey_{1-2}$ protected by a shared key $KEY_{B-1}$ between the neighboring encryption switching equipment (ESW-B) and the user terminal (STA1); the decrypting sub-module is configured to decrypt the field of encrypted information of $STAKey_{1-2}$ by using the key $KEY_{B-1}$ between the user terminal (STA1) and the neighboring encryption switching equipment (ESW-B), and obtaining an inter-station key $STAKey_{1-2}$ between the user terminal (STA1) and the second user terminal (STA2).

Preferably, the user terminal further comprises a receiving module, a decrypting module, a constructing module, and a transmitting module, wherein the receiving module is configured to receive an inter-station key notifying packet (M4) transmitted from the neighboring encryption switching equipment (ESW-B), the inter-station key notifying packet (M4) includes identity information of the user terminal (STA1) and a field of encrypted information of $STAKey_{1-2}$ protected by a shared key $KEY_{B-2}$ between the neighboring encryption switching equipment (ESW-B) and the second user terminal (STA2); the decrypting module is configured to decrypt the field of encrypted information of $STAKey_{1-2}$ by using the key $KEY_{B-2}$ between the second user terminal (STA2) and the neighboring encryption switching equipment (ESW-B), and obtain an inter-station key $STAKey_{1-2}$ between the second user terminal (STA2) and the user terminal (STA1); the constructing module is configured to construct an inter-station key notification responding packet (M5), the inter-station key notification responding packet (M5) includes identity information of the first user terminal (STA1); the transmitting module is configured to transmit the inter-station key notification responding packet (M5) to the neighboring encryption switching equipment (ESW-B).

With respect to the functions and effects of the various modules in the user terminal, see the corresponding realizing process in the aforementioned method for details, and no repetition will be made in this context.

Correspondingly, the present invention further provides an encryption switching equipment neighboring to a first user terminal and a second user terminal respectively, and comprising a first receiving module, a first generating module, a first transmitting unit, a second receiving module, a second generating module and a second transmitting unit, wherein the first receiving module is configured to receive an inter-station key requesting packet (M3) transmitted from the first user terminal (STA1) for requesting to help to establish an inter-station key between the first user terminal (STA1) and the second user terminal (STA2); the first generating module is configured to generate a random number according to the inter-station key requesting packet (M3), take the random number as an inter-station key $STAKey_{1-2}$ between the first user terminal (STA1) and the second user terminal (STA2), and construct an inter-station key notifying packet (M4), the inter-station key notifying packet (M4) includes identity information of the first user terminal (STA1) and a field of encrypted information of $STAKey_{1-2}$ protected by a shared key $KEY_{B-2}$ between the neighboring encryption switching equipment (ESW-B) and the second user terminal (STA2); the first transmitting module is configured to transmit the inter-station key notifying packet (M4) to the second user terminal (STA2); the second receiving module is configured to receive an inter-station key notification responding packet (M5) transmitted from the second user terminal (STA2), the inter-station key notification responding packet (M5)

includes identity information of the first user terminal (STA1); the second generating module is configured to construct an inter-station key responding packet (M6), the inter-station key responding packet (M6) includes identity information of the second user terminal (STA2) and a field of encrypted information of STAKey$_{1-2}$ protected by a shared key KEY$_{B-1}$ between the neighboring encryption switching equipment (ESW-B) and the first user terminal (STA1); the second transmitting module is configured to transmit the inter-station key responding packet (M6) to the first user terminal (STA1).

With respect to the functions and effects of the various modules in the encryption switching equipment, see the corresponding realizing process in the aforementioned method for details, and no repetition will be made in this context.

The invention claimed is:

1. A secret communication method between neighboring user terminals, comprising:
   1) determining a neighboring encryption switching equipment shared by a first user terminal and a second user terminal, wherein the first user terminal and the second user terminal are neighboring user terminals;
   2) establishing, by the neighboring encryption switching equipment, an inter-station key for communication between the first user terminal and the second user terminal; and
   3) performing data secret communication between the first user terminal and the second user terminal by using the inter-station key,
   wherein the step 1) comprising:
   1A) the first user terminal (STA1) transmits a neighboring encryption switching equipment selection requesting packet (M1) to the second user terminal (STA2), the neighboring encryption switching equipment selection requesting packet includes a list of information of neighboring encryption switching equipments of the first user terminal (STA1);
   1B) after receiving, the neighboring encryption switching equipment selection requesting packet (M1) transmitted by the first user terminal (STA1), the second user terminal (STA2) looks us a list of neighboring encryption switching equipments of the second user terminal (STA2), selects a neighboring encryption switching equipment shared with the first user terminal (STA1), constructs a neighboring encryption switching equipment selection responding packet (M2), and transmits the neighboring encryption switching equipment selection responding packet (M2) to the first user terminal (STA1); the neighboring encryption switching equipment selection responding packet (M2) includes information of the neighboring encryption switching equipment selected by the second user terminal (STA2) and shared with the first user terminal (STA1);
   1C) after receiving the neighboring encryption switching equipment selection responding packet (M2) transmitted from the second user terminal (STA2), the first user terminal (STA1) extracts the information of the neighboring encryption switching equipment selected by the second user terminal STA2 and shared with the first user terminal (STA1).

2. The secret communication method between neighboring user terminals according to claim 1, wherein
   the neighboring encryption switching equipment selection requesting packet (M1) transmitted in step 111) further includes a field of list of encryption algorithm safety parameter suites supported by the first user terminal (STA1);
   the step 1B) further comprises: after receiving the neighboring encryption switching equipment selection requesting packet (M1) transmitted from the first user terminal (STA1), the second user terminal (STA2) selects an encryption algorithm safety parameter suite supported by both the first user terminal (STA1) and the second user terminal (STA2) according to the field of list of encryption algorithm safety parameter suites supported by the first user terminal (STA1) in the packet; and the neighboring encryption switching equipment selection responding packet (M2) further includes a field of safety parameter suite such as an encryption algorithm also supported by the second user terminal (STA2) as selected by the second user terminal (STA2) from the list of the encryption algorithm safety parameter suites supported by the first user terminal (STA1);
   the step 1C) further comprises: after receiving the neighboring encryption switching equipment selection responding packet (M2) transmitted from the second user terminal (STA2), the first user terminal (STA1) extracts the encryption algorithm safety parameter suite supported by the first user terminal (STA1) and the second user terminal (STA2) and selected by the second user terminal (STA2).

3. The secret communication method between neighboring user terminals according to claim 1, wherein the step 2) comprising:
   2A1) the first user terminal (STA1) transmits an inter-station key requesting packet (M3) to a neighboring encryption switching equipment (ESW-B) for requesting to help to establish an inter-station key between the first user terminal (STA1) and the second user terminal (STA2); the inter-station key requesting packet (M3) includes identity information of the second user terminal (STA2);
   2A2) after receiving the inter-station key requesting packet (M3) transmitted from the first user terminal (STA1), the neighboring encryption switching equipment (ESW-B) generates a random number, takes the random number as an inter-station key STAKey1-2 between the first user terminal (STA1) and the second user terminal (STA2), constructs an inter-station key notifying packet (M4), and transmits the inter-station key notifying packet (M4) to the second user terminal (STA2); the inter-station key notifying packet (M4) includes identity information of the first user terminal (STA1) and a field of encrypted information of STAKey1-2 protected by a shared key KEYB-2 between the neighboring encryption switching equipment (ESW-B) and the second user terminal (STA2);
   2A3) after receiving the inter-station key notifying packet (M4) transmitted from the neighboring encryption switching equipment (ESW-B), the second user terminal (STA2) decrypts the field of encrypted information of STAKey1-2 by using the key KEYB-2 between the second user terminal (STA2) and the neighboring encryption switching equipment (ESW-B) to obtain STAKey1-2 information, obtains the inter-station key STAKey1-2 between the first user terminal (STA1) and the second user terminal (STA2), constructs an inter-station key notification responding packet (M5), and transmits the inter-station key notification responding packet (M5) to the neighboring encryption switching equipment (ESW-B); the inter-station key notification responding packet (M5) includes identity information of the first user terminal (STA1);

2A4) after receiving the inter-station key notification responding packet (M5) transmitted from the second user terminal (STA2), the neighboring encryption switching equipment (ESW-B) learns that the second user terminal (STA2) has received inter-station key information between the first user terminal (STA1) and the second user terminal (STA2), constructs an inter-station key responding packet (M6), and transmits the inter-station key responding packet (M6) to the first user terminal (STA1); the field of inter-station key responding packet (M6) includes identity information of the second user terminal (STA2) and a of encrypted information of STAKey1-2 protected by a shared key KEYB-1 between the neighboring encryption switching equipment (ESW-B) and the first user terminal (STA1);

2A5) after receiving the inter-station key responding packet (M6) transmitted from the neighboring encryption switching equipment (ESW-B), the first user terminal (STA1) decrypts the field of encrypted information of STAKey1-2 by using the key KEYB-1 between the first user terminal (STA1) and the neighboring encryption switching equipment (ESW-B) to obtain STAKey1-2 information, and obtains the inter-station key STAKey1-2 between the first user terminal (STA1) and the second user terminal (STA2).

4. The secret communication method between neighboring user terminals according to claim 3, wherein the step 3) comprising:

data transmitted from the first user terminal (STA1) to the second user terminal (STA2) is transmitted in encryption by the first user terminal (STA1) by using the inter-station key STAKey1-2, and after receiving the encrypted data, the second user terminal (STA2) decrypts the data by using the inter-station key STAKey1-2; data transmitted from the second user terminal (STA2) to the first user terminal (STA1) is transmitted in encryption by the second user terminal (STA2) by using the inter-station key STAKey1-2, and after receiving the encrypted data, the first user terminal (STA1) decrypts the data by using the inter-station key STAKey1-2.

5. The secret communication method between neighboring user terminals according to claim 1, wherein the step 2) comprising:

2B1) the first user terminal (STA1) transmits the inter-station key requesting packet (M3) to the neighboring encryption switching equipment (ESW-B) for requesting to help to establish an inter-station key between the first user terminal (STA1) and the second user terminal (STA2); the inter-station key requesting packet (M3) includes identity information of the second user terminal (STA2) and a field of message integrity verification code MIC1, which is a hash value obtained by hash function calculation of other fields than the field of MIC1 in the packet using the shared key KEYB-1 between the first user terminal (STA1) and the neighboring encryption switching equipment (ESW-B) by the first user terminal (STA1);

2B2) after receiving the inter-station key requesting packet (M3) transmitted from the first user terminal (STA1), the neighboring encryption switching equipment (ESW-B) verifies whether the field of message integrity verification code MIC1 is correct, discards the packet if it is not correct, generates a random number if it is correct, takes the random number as an inter-station key STAKey1-2 between the first user terminal (STA1) and the second user terminal (STA2), constructs an inter-station key notifying packet (M4), and transmits the inter-station key notifying packet (M4) to the second user terminal (STA2); the inter-station key notifying packet (M4) includes identity information of the first user terminal (STA1), a field of encrypted information of STAKey1-2 protected by a shared key KEYB-2 between the neighboring encryption switching equipment (ESW-B) and the second user terminal (STA2), and a field of message integrity verification code MIC2; the field of message integrity verification code MIC2 is a hash value obtained by hash function calculation of other fields than the field of MIC2 in the packet using the shared key KEYB-2 between the neighboring encryption switching equipment (ESW-B) and the second user terminal (STA2) by the neighboring encryption switching equipment (ESW-B);

2B3) after receiving the inter-station key notifying packet (M4) transmitted from the neighboring encryption switching equipment (ESW-B), the second user terminal (STA2) verifies whether the field of message integrity verification code MIC2 is correct, and discards the packet if it is not correct; if it is correct, the second user terminal (STA2) decrypts the field of encrypted information of STAKey1-2 by using the key KEYB-2 between the second user terminal (STA2) and the neighboring encryption switching equipment (ESW-B) to obtain STAKey1-2 information, obtains the inter-station key between the first user terminal (STA1) and the second user terminal (STA2), then constructs an inter-station key notification responding packet (M5), and transmits the inter-station key notification responding packet (M5) to the neighboring encryption switching equipment (ESW-B); the inter-station key notification responding packet (M5) includes identity information of the first user terminal (STA1) and a field of message integrity verification code MIC3; the field of message integrity verification code MIC3 is a hash value obtained by hash function calculation of other fields than the field of MIC3 in the packet using the shared key KEYB-2 between the second user terminal (STA2) and the neighboring encryption switching equipment (ESW-B) by the second user terminal (STA2);

2B4) after receiving the inter-station key notification responding packet (M5) transmitted from the second user terminal (STA2), the neighboring encryption switching equipment (ESW-B) verifies whether the field of message integrity verification code MIC3 is correct, and discards the packet if it is not correct; if it is correct, the neighboring encryption switching equipment (ESW-B) learns that the second user terminal (STA2) has received inter-station key information between the first user terminal (STA1) and the second user terminal (STA2), constructs an inter-station key responding packet (M6), and transmits the inter-station key responding packet (M6) to the first user terminal (STA1); the inter-station key responding packet (M6) includes identity information of the second user terminal (STA2), a field of encrypted information of STAKey1-2 protected by a shared key KEYB-1 between the neighboring encryption switching equipment (ESW-B) and the first user terminal (STA1), and a field of message integrity verification code MIC4; the field of message integrity verification code MIC4 is a hash value obtained by hash function calculation of other fields than the field of MIC4 in the packet using the shared key KEYB-1 between the neighboring encryption switching equipment (ESW-B) and the first user terminal (STA1) by the neighboring encryption switching equipment (ESW-B);

2B5) after receiving the inter-station key responding packet (M6) transmitted from the neighboring encryption switching equipment (ESW-B), the first user terminal (STA1) verifies whether the field of message integrity verification code MIC4 is correct, and discards the packet if it is not correct; if it is correct, the first user terminal (STA1) decrypts the field of encrypted information of STAKey1-2 by using the key KEYB-1 between the first user terminal (STA1) and the neighboring encryption switching equipment (ESW-B) to obtain STAKey1-2 information, and obtains the inter-station key between the first user terminal (STA1) and the second user terminal (STA2).

6. The secret communication method between neighboring user terminals according to claim 1, wherein the step 2) comprising:

2C1) the first user terminal (STA1) transmits the inter-station key requesting packet (M3) to the neighboring encryption switching equipment (ESW-B) for requesting to help to establish an inter-station key between the first user terminal (STA1) and the second user terminal (STA2); the inter-station key requesting packet (M3) includes identity information of the second user terminal (STA2) and a field of list of encryption algorithm safety parameter suites supported by the first user terminal (STA1);

2C2) after receiving the inter-station key requesting packet (M3) transmitted from the first user terminal (STA1), the neighboring encryption switching equipment (ESW-B) generates a random number, takes the random number as an inter-station key STAKey1-2 between the first user terminal (STA1) and the second user terminal (STA2), constructs an inter-station key notifying packet (M4), and transmits the inter-station key notifying packet (M4) to the second user terminal (STA2); the inter-station key notifying packet (M4) includes identity information of the first user terminal (STA1), a field of encrypted information of STAKey1-2 protected by a shared key KEYB-2 between the neighboring encryption switching equipment (ESW-B) and the second user terminal (STA2), and a field of list of encryption algorithm safety parameter suites supported by the first user terminal (STA1);

2C3) after receiving the inter-station key notifying packet (M4) transmitted from the neighboring encryption switching equipment (ESW-B), the second user terminal (STA2) decrypts the field of encrypted information of STAKey1-2 by using the key KEYB-2 between the second user terminal (STA2) and the neighboring encryption switching equipment (ESW-B) to obtain STAKey1-2 information, obtains the inter-station key between the first user terminal (STA1) and the second user terminal (STA2), constructs an inter-station key notification responding packet (M5), and transmits the inter-station key notification responding packet (M5) to the neighboring encryption switching equipment (ESW-B); the inter-station key notification responding packet (M5) includes identity information of the first user terminal (STA1) and a field of an encryption algorithm safety parameter suite also supported by the second user terminal (STA2) as selected by the second user terminal (STA2) from the list of encryption algorithm safety parameter suites supported by the first user terminal (STA1);

2C4) after receiving the inter-station key notification responding packet (M5) transmitted from the second user terminal (STA2), the neighboring encryption switching equipment (ESW-B) learns that the second user terminal (STA2) has received inter-station key information between the first user terminal (STA1) and the second user terminal (STA2), constructs an inter-station key responding packet (M6), and transmits the inter-station key responding packet (M6) to the first user terminal (STA1); the inter-station key responding packet (M6) includes identity information of the second user terminal (STA2), encrypted information of STAKey1-2 protected by a shared key KEYB-1 between the neighboring encryption switching equipment (ESW-B) and the first user terminal (STA1), and a field of the encryption algorithm safety parameter kit selected by the second user terminal (STA2);

2C5) after receiving the inter-station key responding packet (M6) transmitted from the neighboring encryption switching equipment (ESW-B), the first user terminal (STA1) decrypts the field of encrypted information of STAKey1-2 by using the key KEYB-1 between the first user terminal (STA1) and the neighboring encryption switching equipment (ESW-B) to obtain STAKey1-2 information, the STAKey1-2 is the inter-station key between the first user terminal (STA1) and the second user terminal (STA2).

7. The secret communication method between neighboring user terminals according to claim 1, wherein the step 2) comprising:

2D1) the first user terminal (STA1) transmits the inter-station key requesting packet (M3) to the neighboring encryption switching equipment (ESW-B) for requesting to help to establish an inter-station key between the first user terminal (STA1) and the second user terminal (STA2); the inter-station key requesting packet (M3) includes identity information of the second user terminal (STA2), the field of message integrity verification code MIC1, and a field of list of encryption algorithm safety parameter suites supported by the first user terminal (STA1); the field of message integrity verification code MIC1 is a hash value obtained by hash function calculation of other fields than the field of MIC1 in the packet using the shared key KEYB-1 between the first user terminal (STA1) and the neighboring encryption switching equipment (ESW-B) by the first user terminal (STA1);

2D2) after receiving the inter-station key requesting packet (M3) transmitted from the first user terminal (STA1), the neighboring encryption switching equipment (ESW-B) verifies whether the field of message integrity verification code MIC1 is correct, discards the packet if it is not correct, generates a random number if it is correct, takes the random number as an inter-station key STAKey1-2 between the first user terminal (STA1) and the second user terminal (STA2), constructs an inter-station key notifying packet (M4), and transmits the inter-station key notifying packet (M4) to the second user terminal (STA2); the inter-station key notifying packet (M4) includes identity information of the first user terminal (STA1), a field of encrypted information of STAKey1-2 protected by a shared key KEYB-2 between the neighboring encryption switching equipment (ESW-B) and the second user terminal (STA2), the field of message integrity verification code MIC2, and a field of list of encryption algorithm safety parameter suites supported by the first user terminal (STA1); the field of message integrity verification code MIC2 is a hash value obtained by hash function calculation of other fields than the field of MIC2 in the packet using the shared key KEYB-2 between the neighboring encryption switching equipment (ESW-B) and the second user terminal (STA2) by the neighboring encryption switching equipment (ESW-B);

2D3) after receiving the inter-station key notifying packet (M4) transmitted from the neighboring encryption switching equipment (ESW-B), the second user terminal (STA2) verifies whether the field of message integrity verification code MIC2 is correct, and discards the packet if it is not correct; if it is correct, the second user terminal (STA2) decrypts the field of encrypted information of STAKey1-2 by using the key KEYB-2 between the second user terminal (STA2) and the neighboring encryption switching equipment (ESW-B) to obtain STAKey1-2 information, the STAKey1-2 is the inter-station key between the second user terminal (STA2) and the first user terminal (STA1), the second user terminal (STA2) constructs the inter-station key notification responding packet (M5), and transmits the inter-station key notification responding packet (M5) to the neighboring encryption switching equipment (ESW-B); the inter-station key notification responding packet (M5) includes identity information of the first user terminal (STA1), a field of encryption algorithm safety parameter suite also supported by the second user terminal (STA2) as selected by the second user terminal (STA2) from the list of encryption algorithm safety parameter suites supported by the first user terminal (STA1), and the field of message integrity verification code MIC3; the field of message integrity verification code MIC3 is a hash value obtained by hash function calculation of other fields than the field of MIC3 in the packet using the shared key KEYB-2 between the second user terminal (STA2) and the neighboring encryption switching equipment (ESW-B) by the second user terminal (STA2);

2D4) after receiving the inter-station key notification responding packet (M5) transmitted from the second user terminal (STA2), the neighboring encryption switching equipment (ESW-B) verifies whether the field of message integrity verification code MIC3 is correct, and discards the packet if it is not correct; if it is correct, the neighboring encryption switching equipment (ESW-B) learns that the second user terminal (STA2) has received inter-station key information between the first user terminal (STA1) and the second user terminal (STA2), constructs the inter-station key responding packet (M6), and transmits the inter-station key responding packet (M6) to the first user terminal (STA1); the inter-station key responding packet (M6) includes identity information of the second user terminal (STA2), a field of encrypted information of STAKey1-2 protected by a shared key KEYB-1 between the neighboring encryption switching equipment (ESW-B) and the first user terminal (STA1), a field of message integrity verification code MIC, the field of encryption algorithm safety parameter suite selected by the second user terminal (STA2), and the field of message integrity verification code MIC4; the field of message integrity verification code MIC4 is a hash value obtained by hash function calculation of other fields than the field of MIC4 in the packet using the shared key KEYB-1 between the neighboring encryption switching equipment (ESW-B) and the first user terminal (STA1) by the neighboring encryption switching equipment (ESW-B);

2D5) after receiving the inter-station key responding packet (M6) transmitted from the neighboring encryption switching equipment (ESW-B), the first user terminal (STA1) verifies whether the field of message integrity verification code MIC4 is correct, and discards the packet if it is not correct; if it is correct, the first user terminal (STA1) decrypts the field of encrypted information of STAKey1-2 by using the key KEYB-1 between the first user terminal (STA1) and the neighboring encryption switching equipment (ESW-B) to obtain STAKey1-2 information, the STAKey1-2 is the inter-station key between the first user terminal (STA1) and the second user terminal (STA2).

8. The secret communication method between neighboring user terminals according to claim 6, wherein the step 3) comprising:

data transmitted from the first user terminal (STA1) to the second user terminal (STA2) is transmitted in encryption by the first user terminal (STA1) by using the inter-station key STAKey1-2, and after receiving the encrypted data, the second user terminal (STA2) decrypts the data by using the inter-station key STAKey1-2; data transmitted from the second user terminal (STA2) to the first user terminal (STA1) is transmitted in encryption by the second user terminal (STA2) by using the inter-station key STAKey1-2, and after receiving the encrypted data, the first user terminal (STA1) decrypts the data by using the inter-station key STAKey1-2.

9. A user terminal neighboring to a second user terminal, comprising:

a determining module configured to determine a neighboring encryption switching equipment between the user terminal and the second user terminal;

an obtaining module configured to obtain from the neighboring encryption switching equipment an inter-station key for communication with the second user terminal; and a communicating unit configured to communicate with the second user terminal by using the inter-station key, wherein the obtaining module comprises:

a transmitting sub-module configured to transmit an inter-station key requesting packet (M3) to the neighboring encryption switching equipment (ESW-B) for requesting to help to establish an inter-station key between the first user terminal (STA1) and the second user terminal STA2; wherein the inter-station key requesting packet M3 includes identity information of the second user terminal (STA2);

a receiving sub-module configured to receive an inter-station key responding packet (M6) fed back from the neighboring encryption switching equipment (ESW-B), the inter-station key responding packet (M6) includes identity information of the second user terminal (STA2) and a field of encrypted information of STAKey1-2 protected by a shared key KEYB-1 between the neighboring encryption switching equipment (ESW-B) and the user terminal (STA1); and a decrypting sub-module configured to decrypt the field of encrypted information of STAKey1-2 by using the key KEYB-1 between the user terminal (STA1) and the neighboring encryption switching equipment (ESW-B), and obtain the inter-station key STAKey1-2 between the user terminal (STA1) and the second user terminal (STA2).

10. The user terminal according to claim 9, further comprising:
- a receiving module configured to receive an inter-station key notifying packet (M4) transmitted from the neighboring encryption switching equipment (ESW-B), the inter-station key notifying packet (M4) includes identity information of the user terminal (STA1) and a field of encrypted information of STAKey1-2 protected by a shared key KEYB-2 between the neighboring encryption switching equipment (ESW-B) and the second user terminal (STA2);
- a decrypting module configured to decrypt the field of encrypted information of STAKey1-2 by using the key KEYB-2 between the second user terminal (STA2) and the neighboring encryption switching equipment (ESW-B), and obtain the inter-station key STAKey1-2 between the user terminal (STA1) and the second user terminal (STA2);
- a constructing module configured to construct an inter-station key notification responding packet (M5), the inter-station key notification responding packet (M5) includes identity information of the first user terminal (STA1); and
- a transmitting module configured to transmit the inter-station key notification responding packet (M5) to the neighboring encryption switching equipment (ESW-B).

11. An encryption switching equipment neighboring to a first user terminal and a second user terminal, comprising:
- a first receiving module configured to receive an inter-station key requesting packet (M3) transmitted from the first user terminal (STA1) for requesting to help to establish an inter-station key between the first user terminal (STA1) and the second user terminal (STA2);
- a first generating module configured to generate a random number according to the inter-station key requesting packet (M3), take the random number as an inter-station key STAKey1-2 between the first user terminal (STA1) and the second user terminal (STA2), and construct an inter-station key notifying packet (M4), the inter-station key notifying packet (M4) includes identity information of the first user terminal (STA1) and a field of encrypted information of STAKey1-2 protected by a shared key KEYB-2 between the neighboring encryption switching equipment (ESW-B) and the second user terminal (STA2);
- a first transmitting module configured to transmit the inter-station key notifying packet (M4) to the second user terminal (STA2);
- a second receiving module configured to receive an inter-station key notification responding packet (M5) transmitted from the second user terminal (STA2), the inter-station key notification responding packet (M5) includes identity information of the first user terminal (STA1);
- a second generating module configured to construct an inter-station key responding packet (M6), the inter-station key responding packet (M6) includes identity information of the second user terminal (STA2) and a field of encrypted information of STAKey1-2 protected by a shared key KEYB-1 between the neighboring encryption switching equipment (ESW-B) and the first user terminal (STA1); and
- a second transmitting module configured to transmit the inter-station key responding packet (M6) to the first user terminal (STA1).

12. The secret communication method between neighboring user terminals according to claim 2, wherein the step 2) comprising:
- 2A1) the first user terminal (STA1) transmits an inter-station key requesting packet (M3) to a neighboring encryption switching equipment (ESW-B) for requesting to help to establish an inter-station key between the first user terminal (STA1) and the second user terminal (STA2); the inter-station key requesting packet (M3) includes identity information of the second user terminal (STA2);
- 2A2) after receiving the inter-station key requesting packet (M3) transmitted from the first user terminal (STA1), the neighboring encryption switching equipment (ESW-B) generates a random number, takes the random number as an inter-station key STAKey1-2 between the first user terminal (STA1) and the second user terminal (STA2), constructs an inter-station key notifying packet (M4), and transmits the inter-station key notifying packet (M4) to the second user terminal (STA2); the inter-station key notifying packet (M4) includes identity information of the first user terminal (STA1) and a field of encrypted information of STAKey1-2 protected by a shared key KEYB-2 between the neighboring encryption switching equipment (ESW-B) and the second user terminal (STA2);
- 2A3) after receiving the inter-station key notifying packet (M4) transmitted from the neighboring encryption switching equipment (ESW-B), the second user terminal (STA2) decrypts the field of encrypted information of STAKey1-2 by using the key KEYB-2 between the second user terminal (STA2) and the neighboring encryption switching equipment (ESW-B) to obtain STAKey1-2 information, obtains the inter-station key STAKey1-2 between the first user terminal (STA1) and the second user terminal (STA2), constructs an inter-station key notification responding packet (M5), and transmits the inter-station key notification responding packet (M5) to the neighboring encryption switching equipment (ESW-B); the inter-station key notification responding packet (M5) includes identity information of the first user terminal (STA1);
- 2A4) after receiving the inter-station key notification responding packet (M5) transmitted from the second user terminal (STA2), the neighboring encryption switching equipment (ESW-B) learns that the second user terminal (STA2) has received inter-station key information between the first user terminal (STA1) and the second user terminal (STA2), constructs an inter-station key responding packet (M6), and transmits the inter-station key responding packet (M6) to the first user terminal (STA1); the field of inter-station key responding packet (M6) includes identity information of the second user terminal (STA2) and a of encrypted information of STAKey1-2 protected by a shared key KEYB-1 between the neighboring encryption switching equipment (ESW-B) and the first user terminal (STA1);
- 2A5) after receiving the inter-station key responding packet (M6) transmitted from the neighboring encryption switching equipment (ESW-B), the first user terminal (STA1) decrypts the field of encrypted information of STAKey1-2 by using the key KEYB-1 between the first user terminal (STA1) and the neighboring encryption switching equipment (ESW-B) to obtain STAKey1-2 information, and obtains the inter-station key STAKey1-2 between the first user terminal (STA1) and the second user terminal (STA2).

13. The secret communication method between neighboring user terminals according to claim 12, wherein the step 3) comprising:
- data transmitted from the first user terminal (STA1) to the second user terminal (STA2) is transmitted in encryption by the first user terminal (STA1) by using the inter-station key STAKey1-2, and after receiving the encrypted data, the second user terminal (STA2) decrypts the data by using the inter-station key STAKey1-2; data transmitted from the second user terminal (STA2) to the first user terminal (STA1) is transmitted in encryption by the second user terminal (STA2) by using the inter-station key STAKey1-2, and after receiving the encrypted data, the first user terminal (STA1) decrypts the data by using the inter-station key STAKey1-2.

14. The secret communication method between neighboring user terminals according to claim 2, wherein the step 2) comprising:
   2B1) the first user terminal (STA1) transmits the inter-station key requesting packet (M3) to the neighboring encryption switching equipment (ESW-B) for requesting to help to establish an inter-station key between the first user terminal (STA1) and the second user terminal (STA2); the inter-station key requesting packet (M3) includes identity information of the second user terminal (STA2) and a field of message integrity verification code MIC1, which is a hash value obtained by hash function calculation of other fields than the field of MIC1 in the packet using the shared key KEYB-1 between the first user terminal (STA1) and the neighboring encryption switching equipment (ESW-B) by the first user terminal (STA1);
   2B2) after receiving the inter-station key requesting packet (M3) transmitted from the first user terminal (STA1), the neighboring encryption switching equipment (ESW-B) verifies whether the field of message integrity verification code MIC1 is correct, discards the packet if it is not correct, generates a random number if it is correct, takes the random number as an inter-station key STAKey1-2 between the first user terminal (STA1) and the second user terminal (STA2), constructs an inter-station key notifying packet (M4), and transmits the inter-station key notifying packet (M4) to the second user terminal (STA2); the inter-station key notifying packet (M4) includes identity information of the first user terminal (STA1), a field of encrypted information of STAKey1-2 protected by a shared key KEYB-2 between the neighboring encryption switching equipment (ESW-B) and the second user terminal (STA2), and a field of message integrity verification code MIC2; the field of message integrity verification code MIC2 is a hash value obtained by hash function calculation of other fields than the field of MIC2 in the packet using the shared key KEYB-2 between the neighboring encryption switching equipment (ESW-B) and the second user terminal (STA2) by the neighboring encryption switching equipment (ESW-B);
   2B3) after receiving the inter-station key notifying packet (M4) transmitted from the neighboring encryption switching equipment (ESW-B), the second user terminal (STA2) verifies whether the field of message integrity verification code MIC2 is correct, and discards the packet if it is not correct; if it is correct, the second user terminal (STA2) decrypts the field of encrypted information of STAKey1-2 by using the key KEYB-2 between the second user terminal (STA2) and the neighboring encryption switching equipment (ESW-B) to obtain STAKey1-2 information, obtains the inter-station key between the first user terminal (STA1) and the second user terminal (STA2), then constructs an inter-station key notification responding packet (M5), and transmits the inter-station key notification responding packet (M5) to the neighboring encryption switching equipment (ESW-B); the inter-station key notification responding packet (M5) includes identity information of the first user terminal (STA1) and a field of message integrity verification code MIC3; the field of message integrity verification code MIC3 is a hash value obtained by hash function calculation of other fields than the field of MIC3 in the packet using the shared key KEYB-2 between the second user terminal (STA2) and the neighboring encryption switching equipment (ESW-B) by the second user terminal (STA2);
   2B4) after receiving the inter-station key notification responding packet (M5) transmitted from the second user terminal (STA2), the neighboring encryption switching equipment (ESW-B) verifies whether the field of message integrity verification code MIC3 is correct, and discards the packet if it is not correct; if it is correct, the neighboring encryption switching equipment (ESW-B) learns that the second user terminal (STA2) has received inter-station key information between the first user terminal (STA1) and the second user terminal (STA2), constructs an inter-station key responding packet (M6), and transmits the inter-station key responding packet (M6) to the first user terminal (STA1); the inter-station key responding packet (M6) includes identity information of the second user terminal (STA2), a field of encrypted information of STAKey1-2 protected by a shared key KEYB-1 between the neighboring encryption switching equipment (ESW-B) and the first user terminal (STA1), and a field of message integrity verification code MIC4; the field of message integrity verification code MIC4 is a hash value obtained by hash function calculation of other fields than the field of MIC4 in the packet using the shared key KEYB-1 between the neighboring encryption switching equipment (ESW-B) and the first user terminal (STA1) by the neighboring encryption switching equipment (ESW-B);
   2B5) after receiving the inter-station key responding packet (M6) transmitted from the neighboring encryption switching equipment (ESW-B), the first user terminal (STA1) verifies whether the field of message integrity verification code MIC4 is correct, and discards the packet if it is not correct; if it is correct, the first user terminal (STA1) decrypts the field of encrypted information of STAKey1-2 by using the key KEYB-1 between the first user terminal (STA1) and the neighboring encryption switching equipment (ESW-B) to obtain STAKey1-2 information, and obtains the inter-station key between the first user terminal (STA1) and the second user terminal (STA2).

15. The secret communication method between neighboring user terminals according to claim 7, wherein the step 3) comprising:
   data transmitted from the first user terminal (STA1) to the second user terminal (STA2) is transmitted in encryption by the first user terminal (STA1) by using the inter-station key STAKey1-2, and after receiving the encrypted data, the second user terminal (STA2) decrypts the data by using the inter-station key STAKey1-2; data transmitted from the second user terminal (STA2) to the first user terminal (STA1) is transmitted in encryption by the second user terminal (STA2) by using the inter-station key STAKey1-2, and after receiving the encrypted data, the first user terminal (STA1) decrypts the data by using the inter-station key STAKey1-2.

* * * * *

UNITED STATES PATENT AND TRADEMARK OFFICE
CERTIFICATE OF CORRECTION

| | | |
|---|---|---|
| PATENT NO. | : 8,850,190 B2 | Page 1 of 1 |
| APPLICATION NO. | : 13/814899 | |
| DATED | : September 30, 2014 | |
| INVENTOR(S) | : Li et al. | |

It is certified that error appears in the above-identified patent and that said Letters Patent is hereby corrected as shown below:

IN THE CLAIMS

Column 13, line 41: Replace "us" with --up--.

Signed and Sealed this
Sixth Day of January, 2015

Michelle K. Lee
*Deputy Director of the United States Patent and Trademark Office*